United States Patent [19]
Amine et al.

[11] Patent Number: 5,720,932
[45] Date of Patent: Feb. 24, 1998

[54] METHOD OF PRODUCING LITHIUM NICKELATE WHICH CONTAINS COBALT

[75] Inventors: Khalil Amine; Hideo Yasuda; Yuko Fujita, all of Kyoto, Japan

[73] Assignee: Japan Storage Battery Co., Ltd., Kyoto, Japan

[21] Appl. No.: 635,403

[22] Filed: Apr. 26, 1996

[30] Foreign Application Priority Data

Apr. 28, 1995 [JP] Japan ................................. 7-129663

[51] Int. Cl.$^6$ ................................................. C01G 53/00
[52] U.S. Cl. ................................................. 423/594
[58] Field of Search ........................... 423/594; 429/223

[56] References Cited

U.S. PATENT DOCUMENTS

| | | | |
|---|---|---|---|
| 4,980,080 | 12/1990 | Lecerf et al. | 429/223 |
| 5,474,752 | 12/1995 | Yamamoto | 423/594 |
| 5,490,320 | 2/1996 | Hasegawa et al. | 429/223 |

FOREIGN PATENT DOCUMENTS

| | | |
|---|---|---|
| A-0345707 | 12/1989 | European Pat. Off. |
| 63-19760 | 1/1988 | Japan |
| A2-2-62245 | 10/1990 | Japan |
| 6-31045 | 2/1994 | Japan |
| A-6-310145 | 11/1994 | Japan |

OTHER PUBLICATIONS

Solid State Ionics, 44, 87, 1990, no month, by J.R. Dahn, et al.

Chem. Express, 7, 689, 1992, no month, by T. Ohzuku, et al.

33rd Battery Discussion Lecture Summary collection, p. 21 (Synthesis and characterization ...), 1992.

J. Electrochem. Soc., 140, 1862, 1993, Jul., by T. Ohzuku, et al.

Solid State Ionics, 69, 238, 1994, no month, by W. Ebner, et al.

Solid State Ionics, 57, 311, 1992, no month, by E. Rossen, et al.

Chem. Express, 6, 161, 1991, no month, by T. Ohzuku, et al.

Solid State Ionics, 53-56, 370, 1992, no month, by C. Delmas, et al.

*Primary Examiner*—Steven Bos
*Attorney, Agent, or Firm*—Sughrue, Mion, Zinn, Macpeak & Seas, PLLC

[57] ABSTRACT

In a method of producing a lithium nickelate according to the present invention, a cobalt containing oxy-nickel hydroxide of a β-type, a γ-type, or a mixture of a β-type and a γ-type is mixed with a lithium salt, and heat treatment is applied to the mixture at a temperature of 400° C. to 500° C.

7 Claims, 6 Drawing Sheets

METHOD OF PRODUCING LITHIUM NICKELATE WHICH CONTAINS COBALT

BACKGROUND OF THE INVENTION

1. Field of the Invention

The present invention relates to a method of producing a nickel oxide containing lithium for a nonaqueous battery.

2. Description of the Related Art

The development of a new high-performance battery is expected to intensify because of the need in being used as a power supply for electronic apparatus. For instance, a manganese-dioxide-zinc battery is used as a primary battery, and a lead acid battery and a nickel battery such as a nickel-cadmium battery, a nickel-zinc battery or a nickel-hydride battery, are used as a secondary battery.

An alkali solution of potassium hydrate, etc. or a water solution of a sulfuric acid, etc. are used as an electrolyte for these batteries. The operating voltage of a battery using a water based solution as an electrolyte is not higher than 2.3 V which is a theoretical decomposition voltage of water. If a battery system has an operating voltage higher than 2.3 V, water is decomposed, and it is difficult to accumulate electric energy in a stable way.

Therefore, a nonaqueous electrolyte have to be used as an electrolyte in a battery having an operating voltage of 3 V or more. A typical one of such batteries is a lithium battery using lithium as its negative electrode. As primary batteries, there are a manganese-dioxide-lithium battery and a carbon-fluoride-lithium battery, and as secondary batteries, there are a manganese-dioxide-lithium battery and a vanadium-oxide-lithium battery.

In a secondary battery using metal lithium as a negative electrode, short circuiting could be generated by dendritic deposition of metal lithium which leads to shorting the battery life. Further, the reactivity of the metal lithium is so high that it could compromise the battery safety. Consequently, as for a high-capacity battery, a so-called lithium ion battery using graphite or carbon as a negative electrode and lithium cobaltate as a positive electrode has been developed.

However, because lithium cobaltate is so expensive, a lithium containing a manganese composite oxide or lithium nickelate has been proposed as an alternative. In the case of lithium containing a manganese composite oxide, problems related to the low capacity of the material and a degradation of the electrochemical performance of the battery upon cycling, were reported.

On the other hand, the structure of lithium nickelate (lithium nickel oxide) which is similar to that of the actually commercialized lithium cobaltate, can be described from a packing of edge sharing $NiO_6$ octahedron separated by lithium ion having oxygen octahedral environment. Furthermore, as reported in Solid State Ionice, 44, 87, 1990; Chem. Express, 7, 689, 1992; and the 33rd Battery Discussion Lecture Summary Collection, pp. 21, 1992, this structure which is closely related to the rock-salt one, can allow a very easy displacement of nickel and lithium ions, specially at high temperature preparation, and lead to a structural disorder which affect seriously the discharge capacity of the material.

As for a method of producing lithium nickelate, for example, according to J. Electrochem. Soc., 140, 1862, 1993, $Ni(NO_3)_2$, $Ni(OH)_2$ and $NiCO_3$ are used as source materials of nickel, and LiOH, $LiNO_3$ and $Li_2CO_3$ as lithium sources, and the heat treatment of the precursors is carried out at 750° C. to 900° C. According to Chem. Express, 7, 689, 1992, $NiCO_3$ and $LiNO_3$ are pressed so as to be in the form of a pellet, and $LiNiO_2$ is synthesized through heat treatment of the pellet at 750° C. in an oxygen stream. According to European Patent No. 0 345 707, and U.S. Pat. No. 4,980,080 (1989), the heat treatment is carried out at 700° C. on a mixture of NiO and LiOH to obtain the material. Further, according to Solid State Ionice, 69, 238, 1994, heat treatment is carried out at 650° C. on $Ni(OH)_2$ and LiOH.

On the other hand, a trial to replace part of nickel by another element is proposed in order to stabilize this lithium nickelate. For example, in Solid State Ionice, 57, 311, 1992, part of nickel is replaced by manganese.

In Chem. Express, 6, 161, 1991, part of nickel is replaced by cobalt. As for a producing method therefor, solutions of $Ni(NO_3)_2$, $Co(NO_3)_2$ and LiOH are mixed together, and then the mixture is preliminarily dried at 90° C., and then heated at 800° C. in air to thereby obtain cobalt containing lithium nickelate $LiNi_{1-x}Co_xO_2$ ($0 \leq x \leq 0.5$).

In Solid State Ionice, 53–56, 370, 1992, heat treatment is carried out on a mixture of $Li_2CO_3$, NiO, and $Co_3O_4$ at 800° C.–1000° C. in the oxygen atmosphere.

On the other hand, there is an attempt to utilize an oxy-nickel-hydroxide, as disclosed in Unexamined Japanese Patent Publication (kokai) No. Sho. 63-19760, in which an oxy-nickel-hydroxide containing 20 to 75% cobalt is proposed as an active material for a lithium battery.

In addition, Unexamined Japanese Patent Publication (kokai) No. Hei. 6-310145 has proposed that a hydroxide or oxide containing trivalent nickel ions is mixed with lithium salt, and then the mixture is subjected to heat treatment in order to improve the discharge characteristic. According to this proposal, a sodium hypochlorite solution, a chlorine containing water solution or a bromine containing water solution is reacted with an aqueous sodium hydroxide in which a divalent nickel hydroxide $Ni(OH)_2$ is dispersed to thereby produce a hydroxide or oxide containing an oxy-nickel-hydroxide. Thus the produced hydroxide or oxide is mixed with a lithium nitrate, thereafter the mixture is pressed, molded, dried, heated at 600° C. to 800° C. in the air, and then crushed and molded again, and then heated and sintered at 700° C.–900° C. in the air to thereby produce lithium nickelate.

According to X-ray diffraction analysis of this lithium nickelate, when the integrated intensity ratio between the diffraction line (003) and the diffraction line (104) satisfies $I(003)/I(004) \geq 1.34$, the material is near stoichiometric composition with lithium content averaging 7.2 wt. %. Consequently, the structural disorder is limited, and the discharge capacity is superior. However, during the charge and discharge, multi-stage processes take place with the cell potentional showing 4 plateaus indicating a four-phase reactions due to the occurrences of several structural transitions during charging and discharging. As a result, the electrochemical performance of the battery degraded very quickly upon cycling.

Because of the above mentioned reasons, lithium nickelate has not been used yet as an alternative of lithium cobaltate. From the view point of an electrode reaction, in lithium nickelate, lithium ion dispersion with a charge/discharge reaction may be difficult and the dispersion may not be uniform. Further, a producing method to prepare lithium nickelate having a uniform structure or a large superficial area has not been accomplished.

SUMMARY OF THE INVENTION

It is an object of the present invention to provide a method of producing pure cobalt containing lithium nickelate in which a cobalt containing oxy-nickel hydroxide is used as a source of nickel.

In the method of producing a lithium nickelate according to the present invention, a cobalt containing oxy-nickel hydroxide of a β-type, a γ-type, or a mixture of a β-type and a γ-type is mixed with a lithium salt, and heat treated at a temperature of 400° C. to 500° C.

The positive electrode plate according to the present invention using cobalt-containing lithium nickelate shows excellent characteristics in which the reduction of the capacity upon cycling Is extremely small, and the charge and discharge potential varies in a monotonous way indicating the occurrence of mainly one phase reaction. Accordingly, in this positive electrode plate using the active material, detaching or peeling of the active material due to charge/discharge can be reduced so that the life of the positive electrode plate is prolonged.

BRIEF DESCRIPTION OF THE DRAWINGS

In the accompanying drawings:

FIGS. 3A to 3C show X-ray diffraction patterns (CuKα) in which the influence of atmosphere was examined when the lithium nickelate according to the present invention was synthesized from a β-type of $Ni_{0.85}Co_{0.15}OOH$ and a lithium nitrate; wherein, in FIG. 3A, the atmosphere used is air at 450° C.; in FIG. 3B, the atmosphere used is a mixture of 80% nitrogen and 20% oxygen at 450° C.; in FIG. 3C, the atmosphere used is a mixture of 80% argon and 20% oxygen at 500° C.;

DETAILED DESCRIPTION OF THE INVENTION

The detailed description of the present invention will be described as follows referring to the accompanying drawings.

In the method according to the present invention, unlike the conventional method of producing lithium nickelate, a cobalt containing oxy-nickel hydroxide of a β-type, a γ-type, or a mixture of a β-type and a γ-type is used as a source of nickel to thereby produce pure cobalt containing lithium nickelate.

In that case, since it is preferable that the oxy-nickel hydroxide has a large and uniform surface area, a spherical cobalt doped nickel hydroxide having a particle size of 100 μm or less is oxidized by an oxidizing agent such as a potassium peroxosulfate or the like so as to be changed into a uniform state of a β-type, a γ-type, or a mixture of a β-type and a γ-type with an average valency of 3 or more. Further, a lithium salt such as a lithium nitrate, a lithium hydroxide or the like may be used as a lithium source, but the use of lithium nitrate makes the electrochemical activity high.

The method of producing lithium nickelate according to the present invention does not use any conventional nickel hydroxide, hydroxide or oxide containing trivalent nickel ions, but uses an oxy-nickel hydroxide containing cobalt. The state of this oxy-nickel hydroxide is of a β-type or a γ-type which can be produced according to the method disclosed in Unexamined Japanese Patent Publication (kokai) No. Sho-2-262245.

In this case, a cobalt-containing nickel hydroxide $Ni_{1-x}Co_x(OH)_2$ can be oxidized by a potassium peroxosulfate according to the equation (1) so as to produce a cobalt-containing oxy-nickel hydroxide $Ni_{1-x}Co_xOOH$.

$$Ni_{1-x}Co_x(OH)_2 + S_2O_8^{2-} \rightarrow Ni_{1-x}Co_xOOH + 2HSO_4^{2-}$$

A 0.5 wt. % to 30 wt. % of cobalt doped nickel hydroxide is used so that this oxy-nickel hydroxide $Ni_{1-x}Co_xOOH$ is made into a uniform state of a β-type, a γ-type, or a mixture of a β-type and a γ-type. The state of a β-type, a γ-type, or a mixture of a β-type and a γ-type of the oxy-nickel hydroxide can be controlled by the content of cobalt, the amount of oxidizing agent, the oxidation time, and the value of pH of the oxidizing solution. Incidentally, when a nickel hydroxide containing no cobalt is used, an unreacted nickel hydroxide is left and it is difficult to produce an uniform oxy-nickel hydroxide.

Figure 1:
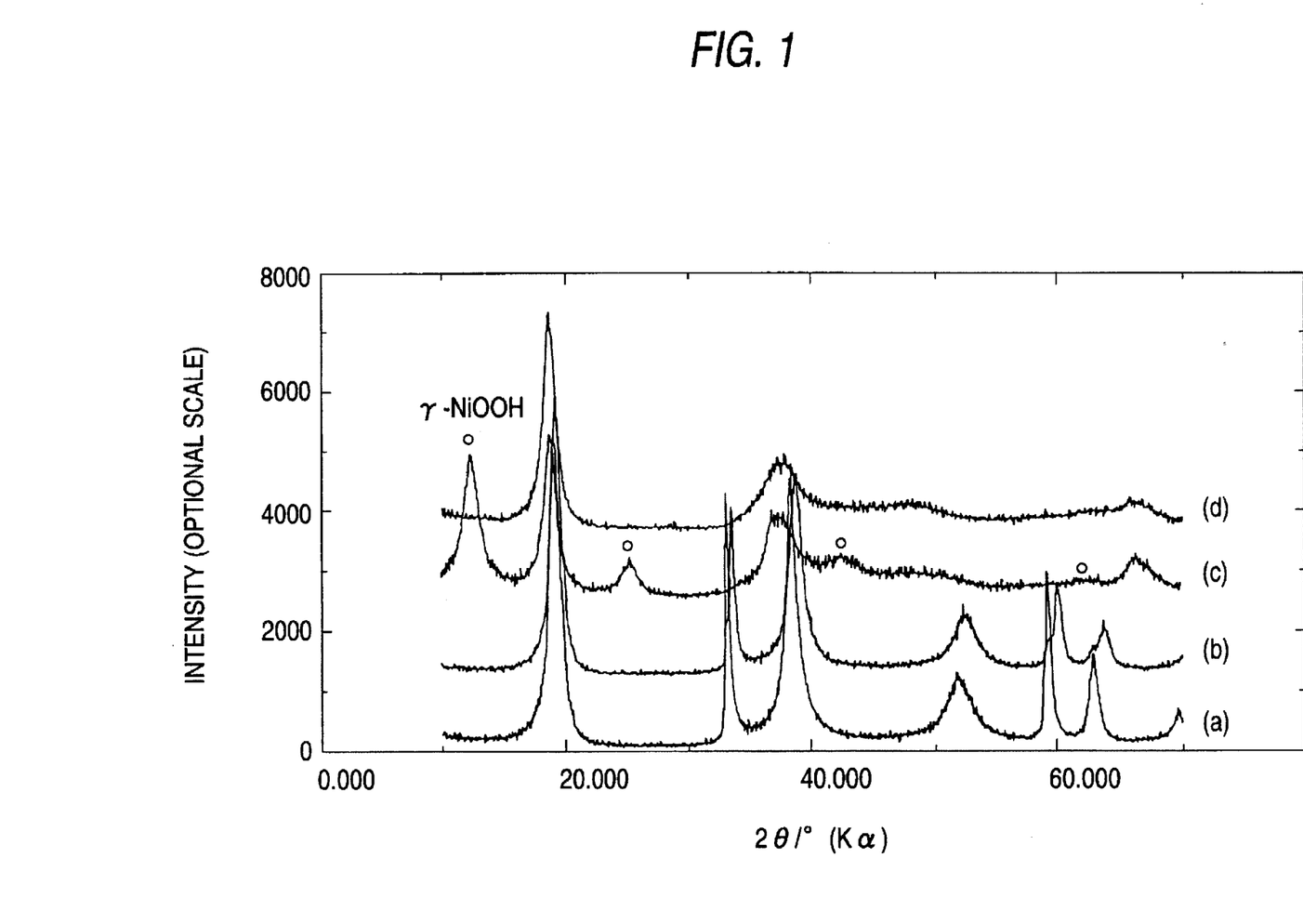
FIG. 1 shows X-ray diffraction patterns of an oxy-nickel hydroxide with different cobalt content.

FIG. 1 shows X-ray diffraction pattern (CuKα) of nickel hydroxide, with different cobalt content, oxidized to give oxy-nickel hydroxides. In FIG. 1, (a) shows $Ni_{0.93}Co_{0.07}(OH)_2$, (b) shows the material (a) partially oxidized, (c) shows a mixture of a β-type and a γ-type of $Ni_{0.89}Co_{0.11}OOH$, and (d) shows a β-type of $Ni_{0.85}Co_{0.15}OOH$.

The lattice constants of material (a) are a=3.12 Å and c=4.6 Å, and after being oxidized, the diffraction peaks of material (b) are shifted to the high angle side in comparison with the pattern (a). Material (c) is a mixture phase of a β-type (a=2.823 Å and c=4.780 Å) and a γ-type (a=3.061 Å and c=20.893 Å). Material (d) is a pure β-type (a=2.84 Å and c=4.729 Å), and the diffraction peaks in this case are broad, indicating that the material has a large surface area.

Next, a lithium nitrate was used as a lithium source as to synthesize lithium nickelate. After an oxy-nickel hydroxide and a lithium nitrate were mixed and ground, the mixture was made into a pellet, and the pellet was subjected to heat treatment in an atmosphere of a mixture of argon (50% to 80%) and oxygen (50% to 20%) or a mixture of nitrogen (50% to 80%) and oxygen (50% to 20%). The heat treatment was carried out in the temperature range between 400° C. and 750° C. for 8 to 16 hours, and in the case of heating at 750° C., pre-heat treatment was carried out at 450° C. for 6 hours.

Figure 2A:
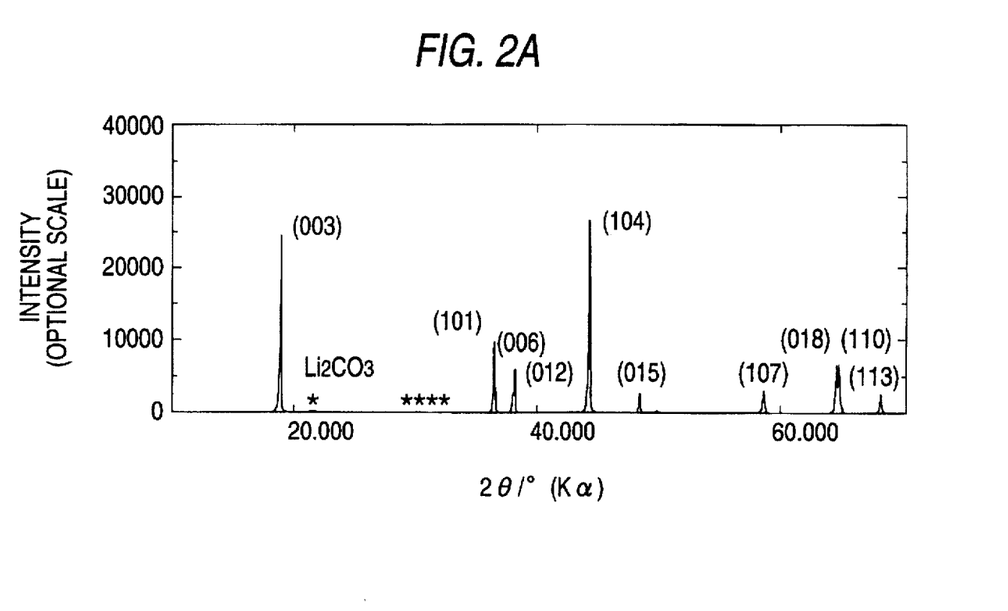
FIG. 2A shows an X-ray diffraction pattern (CuKα) of lithium nickelate obtained in a conventional method, that is, by heating a nickel hydroxide $Ni(OH)_2$ and a lithium nitrate at 750° C. in the air atmosphere.
Figure 2B:
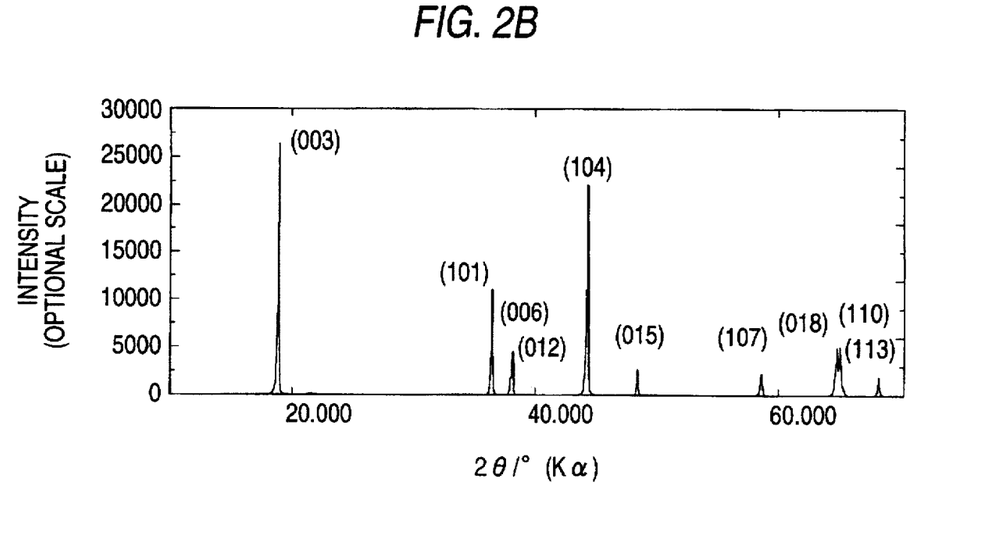
FIG. 2B shows an X-ray diffraction pattern of lithium nickelate produced by heating cobalt-containing $Ni_{0.89}Co_{0.11}OOH$ of a mixture of a β-type and a γ-type and a lithium nitrate in an oxygen and argon atmosphere according to the present invention.

FIG. 2A shows an X-ray diffraction pattern (CuKα) of lithium nickelate obtained using a conventional method, that is, by heating a nickel hydroxide $Ni(OH)_2$ and a lithium nitrate at 750° C. in the air atmosphere according to the conventional method. FIG. 2B shows X-ray diffraction pattern of lithium nickelate produced by heating cobalt-containing $Ni_{0.89}Co_{0.11}OOH$ of a mixture of a β-type and a γ-type and a lithium nitrate in an argon atmosphere according to the present invention.

As shown in FIG. 2A, there were impurities of $Li_2CO_3$ according to the conventional method, and the integrated intensity ratio between (003) diffraction peak and (104) diffraction peak was I(003)/I(104)=0.92. The separation between the peaks of the (108) plane and (110) plane and the separation between the peaks of the (006) plane and (102) plane were unclear and effect the presence of a structural disorder. The lattice constants were a=2.87 Å and c=14.202 Å, and the unit volume was 105±0.046 Å$^3$.

On the other hand, as shown in FIG. 2B, the lithium nickelate doped with cobalt $LiNi_{0.89}Co_{0.11}O_2$ according to the present invention presents a single phase, and had a hexagonal structure of an R$\bar{3}$m space group, in which the lattice constants were a=2.877 Å and c=14.1980 Å, and the unit cell volume was 101.780±0.018 Å$^3$. The value of the integrated intensity ratio I(003)/I(104) was 1.22. The separation between the peaks of the (108) plane and (110) plane and the separation between the peaks of (006) plane and (012) plane were very clear. Accordingly, the lithium nickelate according to the present invention has a stable and ordered crystal structure, the particles are small, and the surface area is relatively large.

Figure 3A:
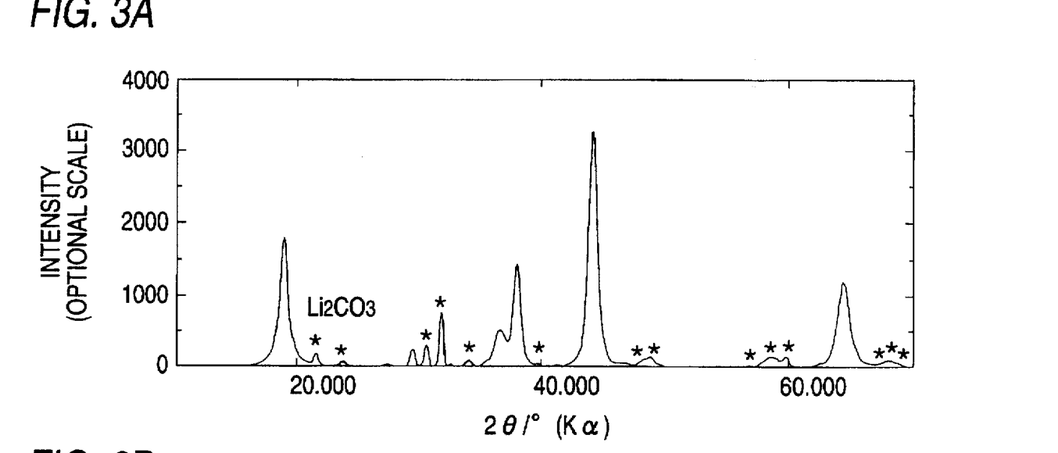
Figure 3B:
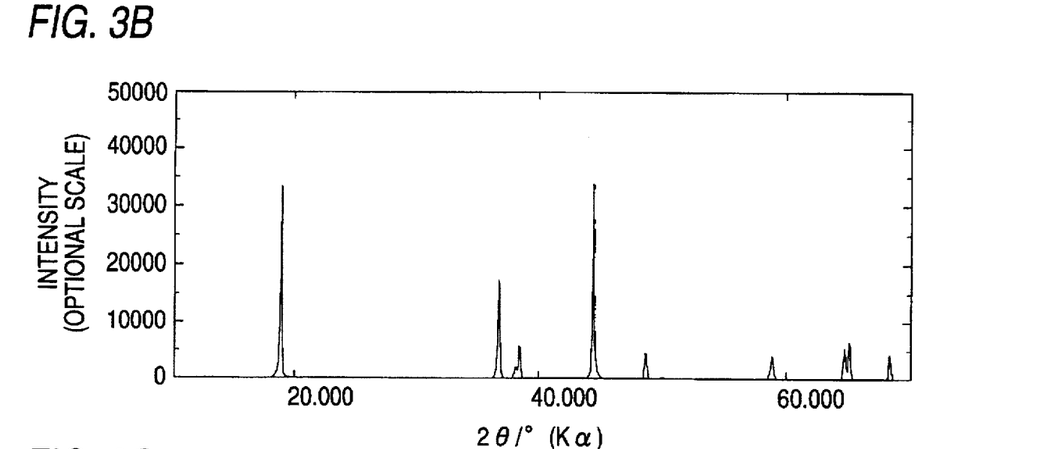
Figure 3C:
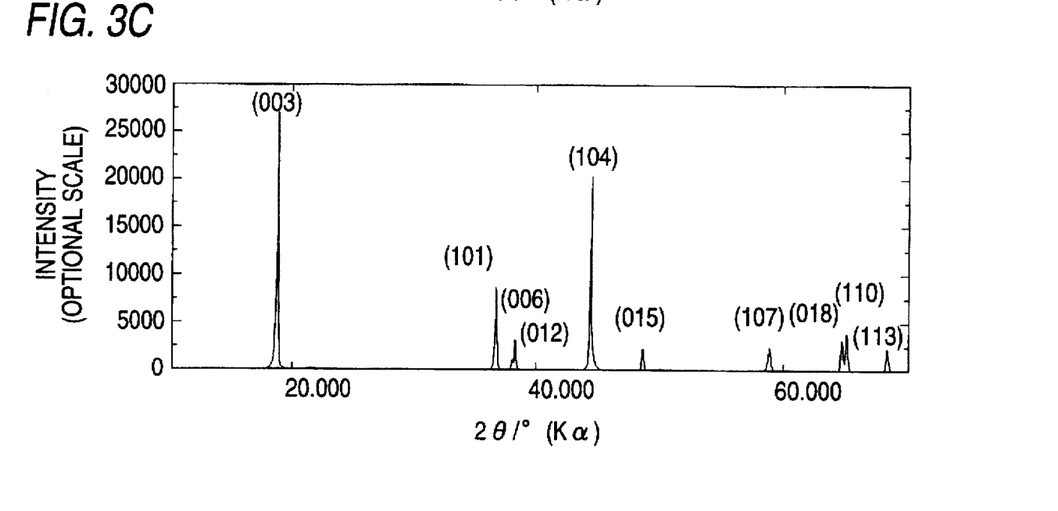

FIGS. 3A to 3C show X-ray diffraction patterns (CuKα) where the influence of the preparation atmosphere was examined when the lithium nickelate according to the present invention was synthesized from a β-type of $Ni_{0.85}Co_{0.15}OOH$ and a lithium nitrate. In FIG. 3A, the atmosphere used is air at 450° C. In FIG. 3B, the atmosphere used is a mixture of 80% nitrogen and 20% oxygen at 450° C. In FIG. 3C, the atmosphere used is a mixture of 80% argon and 20% oxygen at 500° C.

As shown in FIG. 3A, $Li_2CO_3$ was detected as impurities in the air atmosphere.

Although a trace of $Li_2CO_3$ was detected when using a mixed atmosphere of 80% nitrogen end 20% oxygen as shown in FIG. 3B, the obtained $LiNi_{0.85}Co_{0.15}O_2$ (lattice constants a=2.883 Å and c=14.140 Å, unit cell volume 101.799±0.014 Å$^3$) had mainly a pure hexagonal structure with R$\bar{3}$m space group.

As shown in FIG. 3C, no impurities were detected when using a mixed atmosphere of 80% argon and 20% oxygen, and the obtained $LiNi_{0.85}Co_{0.15}O_2$ (lattice constants a=2.871 Å and c=14.190 Å, unit cell volume 101.30±0.024 Å$^3$) had a pure hexagonal structure with R$\bar{3}$m space group. The value of the integrated intensity ratio I(003)/I(104) was very large, 1.49. The separation between the peaks of the (108) plane and (110) plane and the separation between the peaks of the (006) plane and (012) plane were very clear.

Further, when a similar experiment was carried out at 400° C. by using nitrogen in place of argon, a result similar to FIG. 3B was obtained. The value of the intensity ratio I(003)/I(104) was 1.205. It is an important matter that pure lithium nickelate can be obtained at a temperature as low as 400° C. to 500° C. by the solid state reaction, which is an unprecedented case. In this case, if cobalt-containing oxy-nickel hydride $Ni_{1-x}Co_xOOH$ in which the average valency of nickel is trivalent or more is used as a starting material, lithium nickelate (a lithium nickel oxide) having a relatively large surface area and having a pure hexagonal structure with R$\bar{3}$m space group can be produced at a low temperature and in an atmosphere containing a small amount of oxygen.

The lithium nickel oxide doped with cobalt according to the present invention has an extremely useful but unprecedent features in its electrochemical characteristic. The electrode plate for the test was prepared by mixing 87 wt. % of lithium nickel oxide doped with cobalt as an active material, 5 wt. % of acetylene black as a conductive material, and a mixed solution of 5 wt. % of polyvinylidene difluoride and 3 wt. % of a n-methyl-2-pyrrolidon as a binder, and the obtained paste-like mixture was dried and then coated on an aluminum net as a collector, before being vacuum dried at 250° C., whereby a positive electrode plate having a size of 25 mm×25 mm×25 mm was produced.

A trial battery was produced by using this positive electrode plate, a lithium metal plate as counter electrode having the same size as that of the positive electrode plate, and 30 ml electrolyte made of 1M lithium perchlorate dissolved in ethylene carbonate and a diethyl carbonate as solvents. A reference electrode of metal lithium was used for measuring the potential of the positive electrode.

Cycle test was carried out in such a manner that this battery was charged up to 4.3 V with a current density of 0.5 mA/cm$^2$ at 25° C., and thereafter discharged down to 3.0 V with the same current density. The test was further carried out while changing the discharge current density in accordance with necessity.

Figure 4:
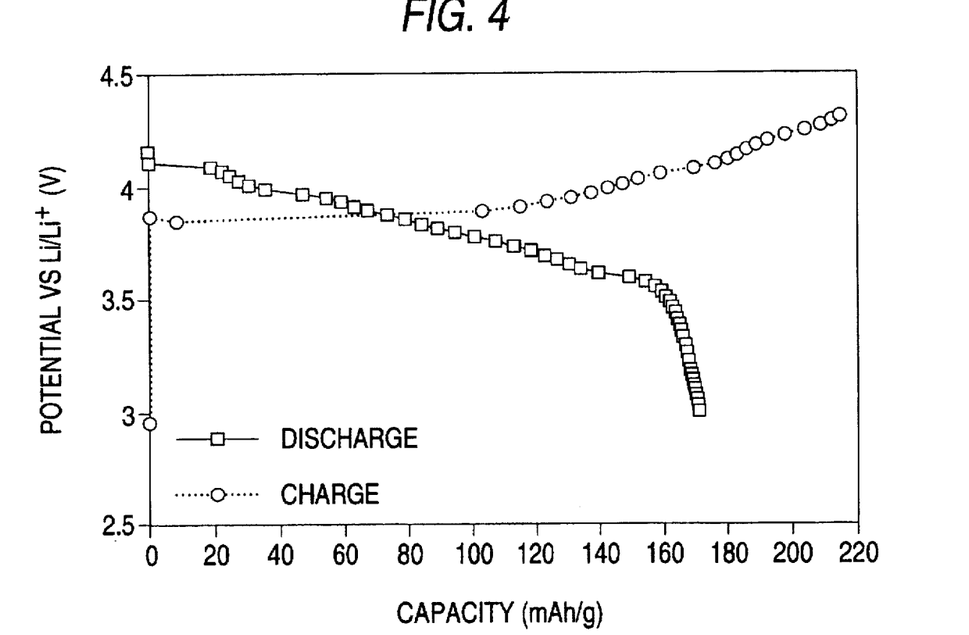
FIG. 4 shows diagrams illustrating the charge-discharge characteristic of the lithium nickelate obtained by a conventional method.
Figure 5:
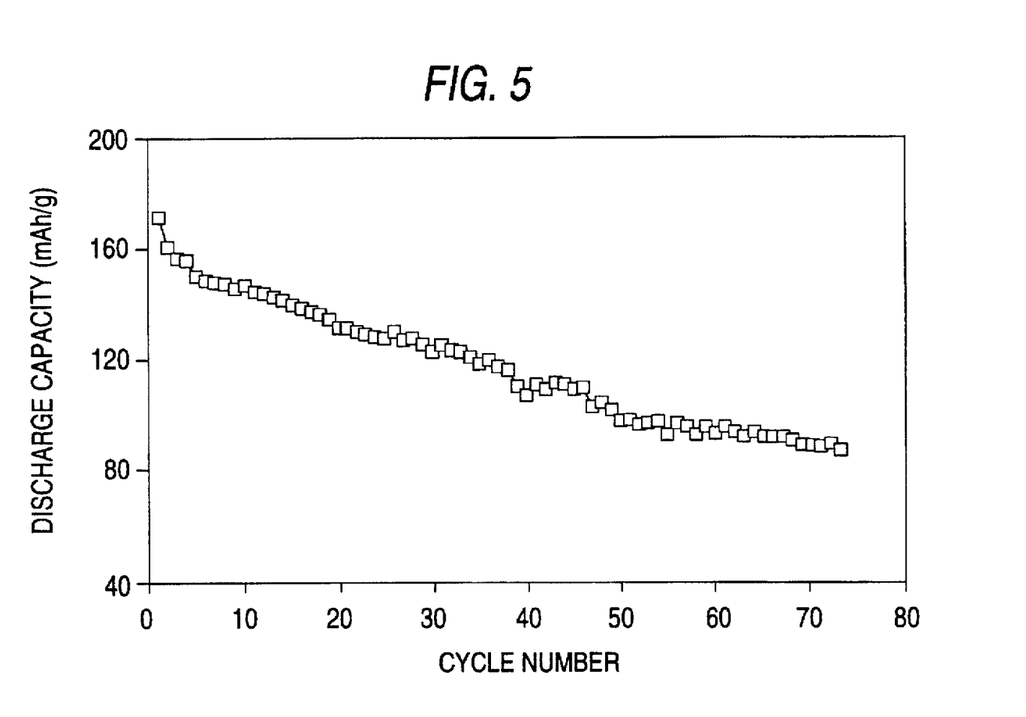
FIG. 5 shows a diagram illustrating the change in the discharge capacity upon cycling of lithium nickelate obtained by a conventional method.

FIG. 4 shows the charge-discharge characteristic of lithium nickelate (lithium nickel oxide) obtained by heat-treating a mixture of a nickel hydroxide and a lithium hydroxide at 750° C. in an oxygen atmosphere according to the conventional method. FIG. 5 shows the variation of the discharge capacity upon cycling. The charge-discharge curves exhibit several plateaus indicating the occurrence of several phase reactions taking place during the process of charge and discharge inducing thus a substantial decrease in the capacity as the cycle goes.

Figure 6:
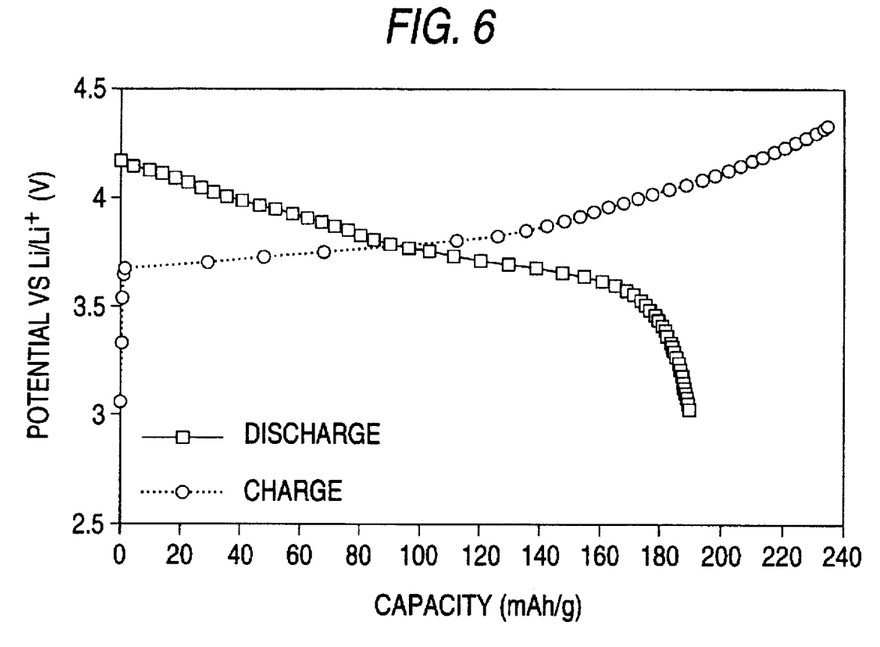
FIG. 6 shows diagrams illustrating the charge-discharge characteristic of lithium nickelate $LiNi_{0.89}Co_{0.11}O_2$ according to the present invention.
Figure 7:
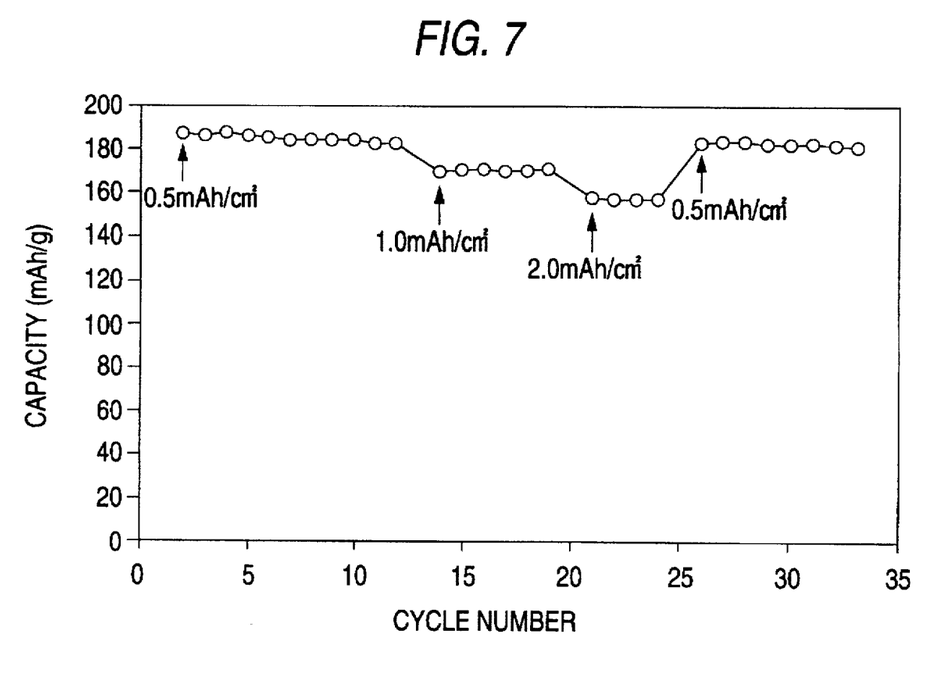
FIG. 7 shows a diagram illustrating the change in the discharge capacity upon cycling of lithium nickelate $LiNi_{0.89}Co_{0.11}O_2$ according to the present invention using different current densities.

On the other hand, FIG. 6 shows the charge-discharge characteristic of the cobalt doped lithium nickel oxide $LiNi_{0.89}Co_{0.11}O_2$ obtained by heat-treating a mixture of β- and γ-type $Ni_{0.89}Co_{0.11}OOH$ and a lithium nitrate at 750° C. under a mixed atmosphere of 80% argon and 20% oxygen according to the present invention. FIG. 7 shows the change of the discharge capacity as the cycle goes. There arises a significant change in the charge-discharge characteristic. That is, the charge-discharge characteristic (FIG. 6) shows a monotonous variation of the potential with capacity indicating the occurrence of one phase reaction during charge and discharge rather than a multi-phase as observed in the material prepared by the conventional method.

Further, the decrease of the discharge capacity (FIG. 7) is very limited as the cycle goes, that is, the material shows a stable large capacity value of 190 mAh/g. Further, even if the discharge current density is increased from 0.5 mA/cm$^2$ to 1.0 mA/cm$^2$ or 2.0 mA/cm$^2$, large decrease in the capacity does not take place.

Figure 8:
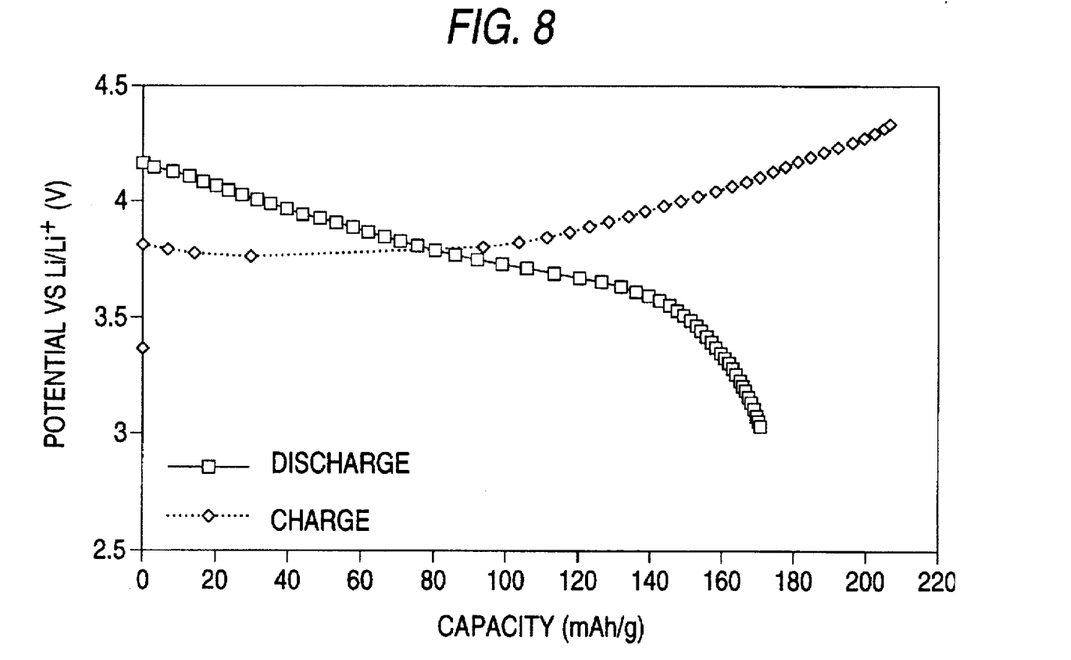
FIG. 8 shows diagrams illustrating the charge/discharge characteristic of cobalt-containing lithium nickelate $LiNi_{0.85}Co_{0.15}O_2$ according to the present invention.
Figure 9:
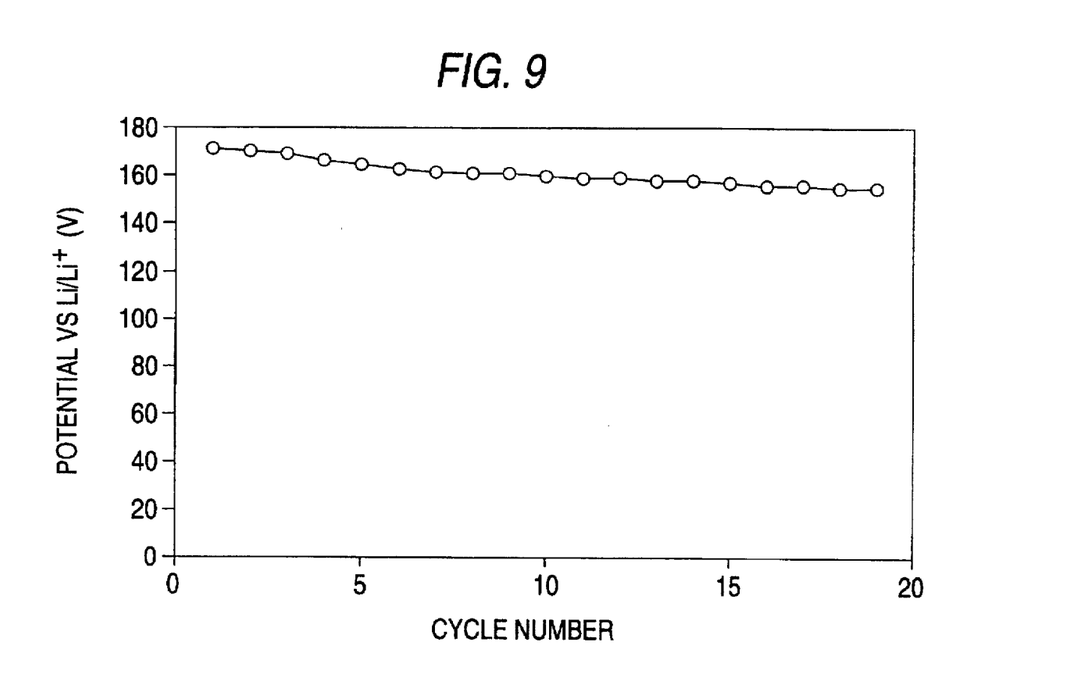
FIG. 9 shows a diagram illustrating the change in the discharge capacity upon cycling of cobalt-containing lithium nickelate $LiNi_{0.85}Co_{0.15}O_2$ according to the present invention.

FIG. 8 shows the charge-discharge characteristic of the cobalt doped lithium nickel oxide $LiNi_{0.85}Co_{0.15}O_2$ obtained by heat-treating a β-type $Ni_{0.85}Co_{0.15}OOH$ and a lithium nitrate at 400° C. in a mixed atmosphere of 80% argon and 20% oxygen according to the present invention. FIG. 9 shows the variation of the discharge capacity as the cycle goes. The charge-discharge characteristic shows a monotonous variation of the potential with capacity revealing the occurrence of one phase reaction during charge and discharge. Further, a very limited decrease in the capacity is observed during cycling.

As has been described above, electrochemical characteristics the cobalt doped lithium nickelate (lithium nickel oxide) according to the present invention shows a behavior different from the conventional one, with the charge-discharge curves varies in a monotonous way rather than in a multi-stage way. This indicates that a uniform one phase reaction occur during the charge and discharge processes of the electrode.

It is therefore possible to produce a battery having less load variations than a battery using conventional lithium nickelate, and having a large capacity and a superior high discharge performance. The content of cobalt in such a superior cobalt-doped lithium nickelate (lithium nickel oxide) is preferably when the cobalt content is within a range of $0.05 \leq x \leq 0.5$ in $LiNi_{1-x}Co_xO_2$, and more preferably within a range of $0.05 \leq x \leq 0.3$, from the economical point of view.

EXAMPLE 1

A stoichiometric amount of cobalt-doped oxy-nickel hydroxide $Ni_{0.93}Co_{0.07}OOH$ with an average particle size of 20 µm and a lithium nitrate were mixed, ground pelletized, and then heated at 400° C. for 16 hours in a mixed atmosphere of 80% argon and 20% oxygen to thereby produce cobalt-doped lithium nickelate $LiNi_{0.93}Co_{0.07}O_2$ according to the present invention.

EXAMPLE 2

A stoichiometric amount of a mixture of β- and γ-type mixed $Ni_{0.89}Co_{0.11}OOH$ with an average particle size of 20 µm and a lithium nitrate were mixed, ground before being pelletized, and then heated at 500° C. for 16 hours in a mixed atmosphere of 80% nitrogen and 20% oxygen to thereby produce cobalt-doped lithium nickelate $LiNi_{0.89}Co_{0.11}OO_2$ according to the present invention.

EXAMPLE 3

A stoichiometric amount of β-type $Ni_{0.85}Co_{0.15}OOH$ with an average particle size of 10 µm and a lithium nitrate were mixed, ground before being pelletized and heated at 400° C. for 16 hours in a mixed atmosphere of 80% argon and 20% oxygen to thereby produce cobalt-doped lithium nickelate $LiNi_{0.85}Co_{0.15}O_2$ according to the present invention.

As has been described above, a positive electrode plate using cobalt-doped lithium nickelate according to the present invention shows a superior characteristic where the decrease of the capacity with charge/discharge cycling is extremely small, and the discharge potential varies in a monotonous way. This is because the plate are formed from a homogeneous component having a small amount of impurities so that the reaction becomes uniform and the expansion/shrinkage of an active material due to charge/discharge is small. Accordingly, in this positive electrode plate using the active material, detaching or peeling of the active material due to charge/discharge can be reduced so that the life of the positive electrode plate is prolonged.

What is claimed is:

1. A method of producing a lithium nickelate comprising the steps of:

mixing a lithium salt with an oxy-nickel hydroxide containing cobalt; and applying heat to the mixture to produce a lithium nickelate containing cobalt;

wherein said oxy-nickel hydroxide containing cobalt is of the formula $Ni_{1-x}Co_xOOH$ where x is in the range of 0.05 to 0.5.

2. A producing method according to claim 1, wherein said lithium salt comprises at least one of a lithium nitrate, a lithium hydroxide and a lithium carbonate.

3. A producing method according to claim 1, wherein said oxy-nickel hydroxide comprises at least one of a β-phase, a γ-phase and a mixture of β-phase and γ-phase.

4. A producing method according to claim 1, wherein a temperature of said heat is in the range of 400° C. to 500° C.

5. A producing method according to claim 1, wherein said oxy-nickel hydroxide containing cobalt is of the formula $Ni_{1-x}Co_xOOH$ where x is in the range of 0.05 to 0.3.

6. A producing method according to claim 1, wherein the step of applying heat is conducted in an atmosphere of a gas comprising oxygen and at least one of argon and nitrogen.

7. A producing method according to claim 1, wherein said oxy-nickel hydroxide containing cobalt has a particle size of 100 µm or less.

* * * * *